United States Patent [19]

Takebayashi

[11] Patent Number: 5,398,742
[45] Date of Patent: Mar. 21, 1995

[54] TIRE STRUCTURE

[76] Inventor: Tohichi Takebayashi, 1018 Negishi, Oaza Angyoryo, Kawaguchi-shi, Saitama-ken, Japan

[21] Appl. No.: 72,221

[22] Filed: Jun. 3, 1993

[30] Foreign Application Priority Data

Oct. 7, 1992 [JP] Japan .................. 4-075883 U

[51] Int. Cl.$^6$ ................... B60C 5/20; B60C 23/00
[52] U.S. Cl. ....................... 152/208; 152/210; 152/415
[58] Field of Search ............ 152/208, 210, 415

[56] References Cited

U.S. PATENT DOCUMENTS

| | | | |
|---|---|---|---|
| 2,480,548 | 8/1949 | Carhart | 152/208 |
| 2,491,491 | 12/1949 | Freygang | 152/208 |
| 2,708,470 | 5/1955 | Gramelspacher | 152/208 |
| 3,766,956 | 10/1973 | Ruane et al. | 152/208 |
| 4,676,289 | 6/1987 | Yi Su | 152/210 |
| 4,815,513 | 3/1989 | Hirakawa | 152/208 X |

*Primary Examiner*—Michael W. Ball
*Assistant Examiner*—Francis J. Lorin
*Attorney, Agent, or Firm*—Frishauf, Holtz, Goodman & Woodward

[57] ABSTRACT

A tire structure includes bag-like members capable of expansion and contraction and which are buried in anti-slip grooves in the tire surface, and an air supply coupled to the bag-like members for supplying air to inflate the bag-like members to cause them to expand and project outwardly of the tire surface. The air supply may include stems coupled to an air source in the wheel part of the tire structure. Normally, the tire structure can be run as a usual tire. When running on a frozen road or the like, the tire structure permits functions and effects like a tire with a chain coupled thereto to be obtained by a simple operation to inflate and expand the bag-like members to cause them to project outwardly of the tire surface, and without need of any cumbersome operation of mounting a chain to the tire.

10 Claims, 1 Drawing Sheet

1

TIRE STRUCTURE

BACKGROUND OF THE INVENTION

1. Field of the Invention

This invention relates to a tire structure, and more particularly the structure of a tire for cars and large-size motorcycles.

2. Prior Art

The tire is a part of a car or the like that is in direct contact with the road surface during running or parking, and usually it has grooves for preventing slipping on a wet road surface or during cornering.

However, on a frozen road surface produced as a result of snowfall or the like, the grooves are insufficient to prevent slipping. In this situation, usually a chain is coupled to the tire for running. Earlier, spike tires were proposed. Recently, however, their use is refrained from because the spikes cause damage to the road surface. In the chain coupling operation, the car is raised by using a jack. The operation is very cumbersome and painful to the unfamiliar person. Besides, the operation is mostly carried out under bad weather conditions.

SUMMARY OF THE INVENTION

The invention is made in view of the above problems in the prior art. The object of the invention is to provide a tire structure which overcomes the above-described problems and permits the meshing and frictional forces of the tire with respect to the road surface to be increased by a one touch operation, thus permitting running on a frozen or snow-covered road without any chain coupled to the tire.

To attain the above object of the invention, there is provided a tire structure which comprises bag-like objects capable of expansion and contraction and which are buried in anti-slip grooves in the tire surface, and air supply ducts coupled to the bag-like objects and having stems coupled to an air source in the wheel part.

With this structure, by opening a switch or valve means provided in the wheel part, air is supplied to the bag-like objects to cause the bag-like objects to project outward from the grooves. The objects in this state can fulfill the role of a chain coupled to the tire.

DETAILED DESCRIPTION OF THE PREFERRED EMBODIMENT

Figure 1:
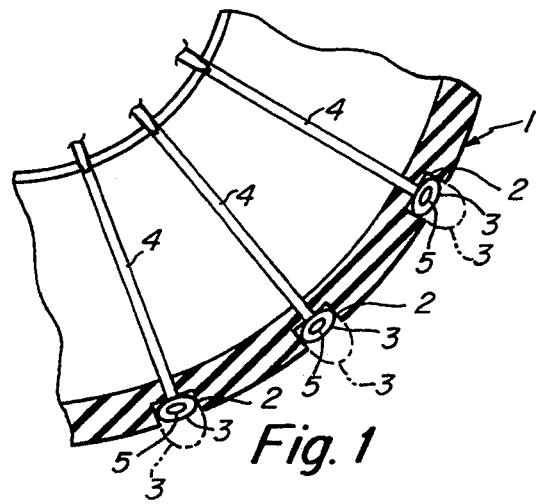
FIG. 1 is a fragmentary sectional view showing an embodiment of the tire structure according to the invention.
Figure 2:
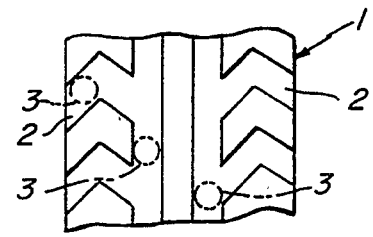
FIG. 2 is a fragmentary side view showing the same tire structure.

Referring to FIGS. 1 and 2 of the drawings, reference numeral 1 designates an automotive tire. The tire 1 has anti-slip grooves 2 in its peripheral surface, i.e., its surface in contact with the ground. In the grooves 2, bag-like members or objects 3 are buried or embedded. The bag-like objects 3 are made of reinforced rubber or like material capable of being expanded and contracted. Normally, they are contracted and not in contact with the ground surface and do not interfere with the anti-slip function of the grooves 2.

A tube 4 or like air supply duct is coupled to each bag-like object 3 for supplying air thereto. The tube 4 may be led through the air space in the tire 1, or it may be led along the outer surface of the tire 1. Where it is led through the air space in the tire 1, as shown in FIG. 1 a mechanism for preventing air leakage from the tire 1 itself has to be provided on or in the coupling section between the tube 4 and bag-like object 3.

The tube 4 or like air supply duct is led to the wheel part with the tire 1 fitted thereon. The wheel part is provided with a switch or the like for supplying air. The switch or the like is coupled to a compressor, a compressed air source, a capsule, etc. and can supply air to the bag-like objects 3 when desired. Normally, the switch or the like is held locked so as not to be inadvertently operated by an external shock or the like.

Figure 3:
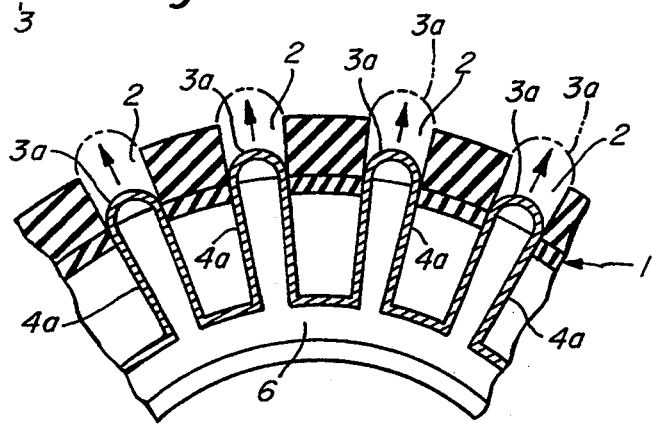
FIG. 3 is a view similar to FIG. 1 but showing a modification of the invention.
Figure 4:
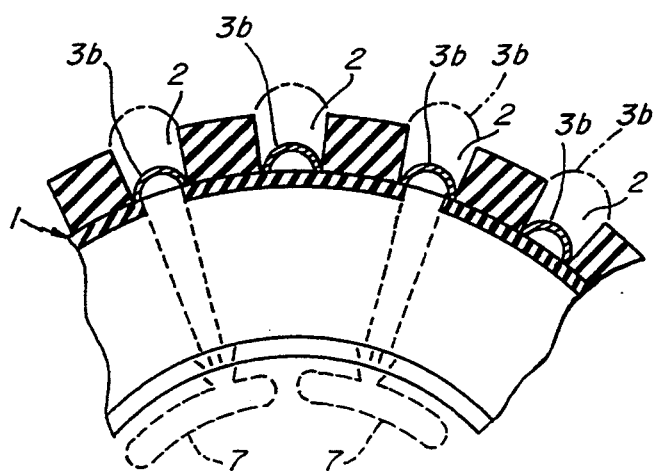
FIG. 4 is a view similar to FIG. 1 but showing a different modification of the invention.
Figure 5:
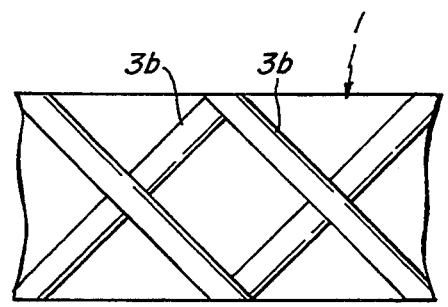
FIG. 5 is a view similar to FIG. 2 but showing the periphery of a different tire structure.

As an alternative arrangement, as shown in FIG. 3, it is possible to have bag-like objects 3a and air supply ducts 4a thereof integrated, and to couple the stems of the air supply ducts 4a via an air duct 6 to a compressor (not shown) or the like. As a further alternative, as shown in FIG. 4, it is possible to have bag-like objects 3b buried or embedded along grooves 2 and to couple the stems of the objects to cartridge bombs (small air tanks) 7. In this arrangement, the tire can withstand running or slippery surface to some extent even when some of the bag-like objects are broken. In addition, the cartridge bombs 7 may be replenished with air in a gasoline station.

In the embodiment of FIG. 1, a wire 5 or like core material is accommodated in each of the bag-like objects 3 to provide for stronger wedging or gripping of the bag-like objects 3 into a frozen road surface and for enhanced durability. The bag-like objects 3 may be provided spot-wise in the grooves 2 as shown in FIG. 2, or they may be provided such that they fit the shape of the grooves 2. In the latter case, the bag-like objects 3 may be connected to one another into a mesh-like form.

With the above tire structure according to the invention, when it becomes necessary to couple a chain to the tire, the same function as obtainable by coupling the chain can be obtained by a one touch switching operation to supply air to the bag-like objects 3 to cause them to inflate and project outwardly of the tire, and without the need of any special cumbersome or difficult jacking or chain coupling operation.

As has been described in the foregoing, the tire structure according to the invention permits the function of the tire with a chain coupled thereto to be obtained by a very simple operation and without the need of preparing any tire. Further, the tire can be quickly made ready for running on a frozen road or the like without the need of a long and difficult outdoor operation in bad weather conditions.

What is claimed is:

1. A tire structure for a vehicle, the tire structure comprising:
   a tire having a tire surface adapted to contact a road surface, said tire having anti-slip grooves in said tire surface for reducing slipping of said tire surface on said road surface;
   inflatable bag-like members capable of expansion and contraction and buried in said anti-slip grooves in said tire surface said bag-like members being normally uninflated, and said bag-like members being inflatable to expand and project outwardly of said tire surface; and air supply means coupled to said bag-like members for selectively supplying air to said bag-like members to inflate and expand said bag-like members.

2. The tire structure of claim 1, wherein said air supply means comprises air ducts coupled to said bag-like members.

3. The tire structure of claim 2, wherein said air ducts pass through an air space in said tire structure.

4. The tire structure of claim 1, wherein said air supply means comprises a compressed air cartridge bomb coupled to at least some of said bag-like members for selectively inflating said bag-like members.

5. The tire structure of claim 4, wherein a plurality of said compressed air cartridge bombs are coupled to respective pluralities of bag-like members.

6. The tire structure of claim 1, wherein said air supply means comprises an annular air space in said tire structure, and said annular air space being coupled to said bag-like members for supplying inflation air to said bag-like members.

7. The tire structure of claim 1, further comprising a wheel part on which said tire is mounted.

8. The tire structure of claim 3, further comprising a wheel part on which said tire is mounted.

9. The tire structure of claim 8, wherein said air ducts are coupled to an air source in said wheel part.

10. The tire structure of claim 1, wherein said bag-like members have metallic members on portions thereof which project outwardly of the tire surface when said bag-like members are inflated.

* * * * *